(12) United States Patent
Zamami

(10) Patent No.: US 12,496,987 B2
(45) Date of Patent: Dec. 16, 2025

(54) PROTECTOR AND WIRE HARNESS

(71) Applicant: SUMITOMO WIRING SYSTEMS, LTD., Yokkaichi (JP)

(72) Inventor: Kanji Zamami, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 229 days.

(21) Appl. No.: 18/574,566

(22) PCT Filed: Jun. 15, 2022

(86) PCT No.: PCT/JP2022/023906
§ 371 (c)(1),
(2) Date: Dec. 27, 2023

(87) PCT Pub. No.: WO2023/276664
PCT Pub. Date: Jan. 5, 2023

(65) Prior Publication Data
US 2024/0286563 A1 Aug. 29, 2024

(30) Foreign Application Priority Data
Jun. 30, 2021 (JP) .............................. JP2021-108559

(51) Int. Cl.
*B60R 16/02* (2006.01)
(52) U.S. Cl.
CPC ................ *B60R 16/0215* (2013.01)

(58) Field of Classification Search
CPC ...... B60R 16/0215; B60R 16/02; F16L 57/00; H01B 7/00; H02G 3/04
USPC ........................................................ 174/72 A
See application file for complete search history.

(56) References Cited

FOREIGN PATENT DOCUMENTS

| JP | H09-37432 A | 2/1997 |
|---|---|---|
| JP | 2011-072085 A | 4/2011 |
| JP | 2012-235575 A | 11/2012 |
| JP | 2018-182890 A | 11/2018 |

OTHER PUBLICATIONS

Jul. 26, 2022 International Search Report issued in International Patent Application No. PCT/JP2022/023906.

*Primary Examiner* — Timothy J Thompson
*Assistant Examiner* — Michael F Mcallister
(74) *Attorney, Agent, or Firm* — Oliff PLC

(57) ABSTRACT

A protector that includes a tube configured to cover an electric wire, wherein the tube includes: a base configured to extend partially around the electric wire in a circumferential direction; a first lid configured to be combined with the base to extend entirely around the electric wire in the circumferential direction; and a second lid provided at a position shifted from the first lid in a length direction of the tube, and configured to be combined with the base to extend entirely around the electric wire in the circumferential direction.

6 Claims, 6 Drawing Sheets

PROTECTOR AND WIRE HARNESS

BACKGROUND

The present disclosure relates to a protector and a wire harness.

There are conventional wire harnesses that include an electric wire member and a protector that has a tubular portion covering the electric wire member (see JP 2012-235575A, for example). The tubular portion has a base portion that extends partially around the electric wire member in the circumferential direction, and a lid that is combined with the base portion to extend entirely around the electric wire member in the circumferential direction. The base portion has a fitted portion, and the lid has a fitting portion that is fitted to the fitted portion by being moved in a direction that intersects the length direction of the tubular portion.

SUMMARY

However, in the above protector, the lid is configured such that the fitting portion is fitted to the fitted portion by being moved along a direction that intersects the length direction of the tubular portion, and thus rattling can easily occur in the direction in which the fitting portion is moved for fitting, specifically in a direction that intersects the length direction of the tubular portion. Thus, if the electric wire member subjects the lid to force acting in a direction away from the base portion, such as the case where the electric wire member is suddenly bent outside the tubular portion, there is concern of the lid moving slightly away from the base portion. Specifically, in a configuration where the tubular portion is long, and the fitting portion is provided on a partial lengthwise portion of the tubular portion, an end portion of the lid in the length direction of the tubular portion may largely move away from the base portion, in other words, largely separate therefrom. Thus, the path of the electric wire may deviate from the proper path, and the electric wire member may come in contact with other nearby components, for example.

An exemplary aspect of the disclosure provides a protector and a wire harness with which a path of an electric wire member can be maintained as the proper path.

A protector according to an aspect of the present disclosure includes: a tube configured to cover an electric wire, wherein: the tube includes: a base configured to extend partially around the electric wire in a circumferential direction; a first lid configured to be combined with the base to extend entirely around the electric wire in the circumferential direction; and a second lid provided at a position shifted from the first lid in a length direction of the tube, and configured to be combined with the base to extend entirely around the electric wire in the circumferential direction, the base includes a rail and a fitted portion, the first lid includes a slide configured to be fitted to the rail by being slid in a first direction conforming to the length direction of the tube, and the second lid includes a fitting portion configured to be fitted to the fitted portion by being moved in a direction intersecting the length direction of the tube, and prevent sliding of the first lid in a second direction opposite to the first direction while the fitting portion is fitted to the fitted portion.

A wire harness according to an aspect of the present disclosure includes the protector and the electric wire member.

With the protector and the wire harness of the present disclosure, the path of an electric wire member can be maintained as the proper path.

DETAILED DESCRIPTION OF EMBODIMENTS

Figure 1:
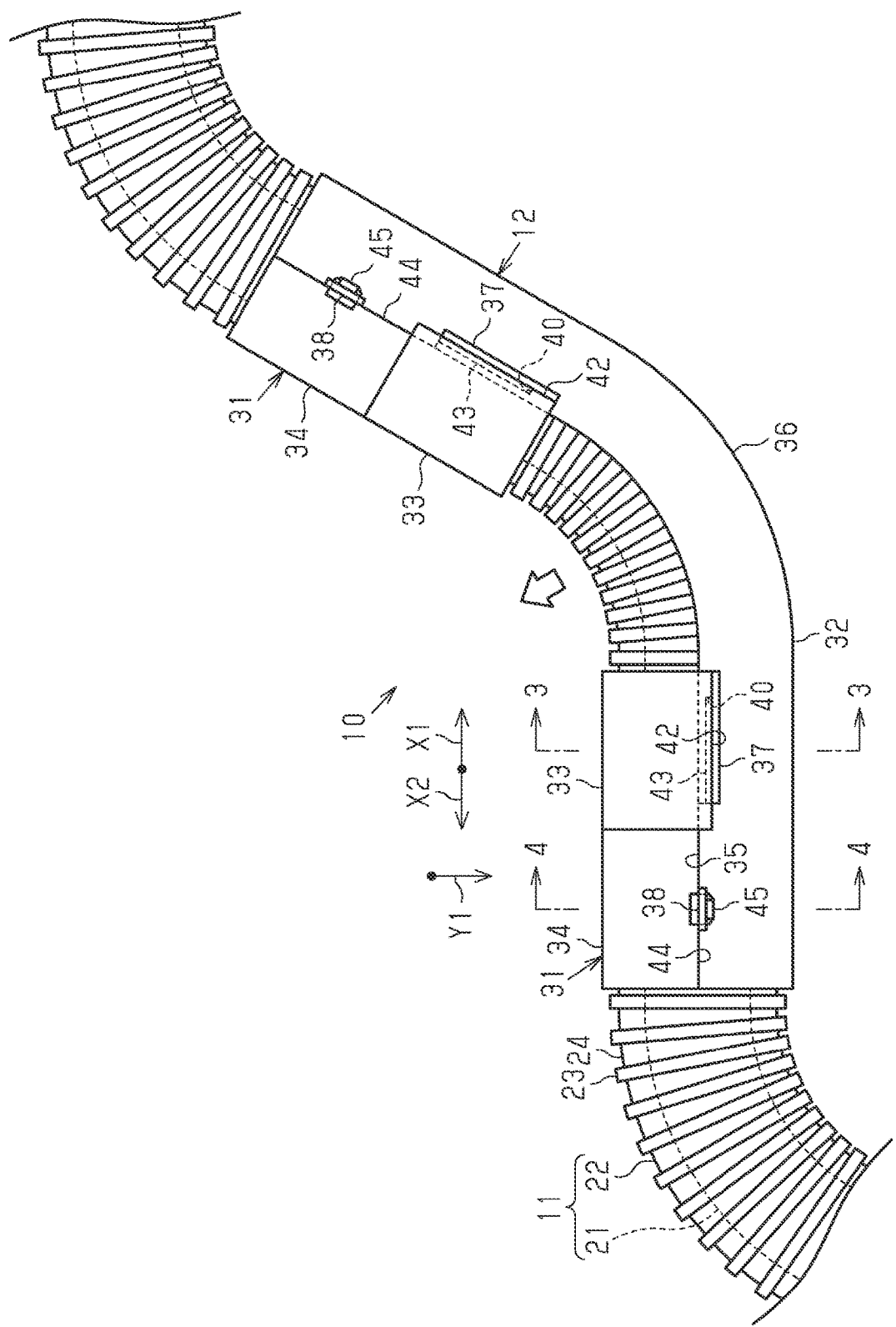
FIG. 1 is a partial side view of a wire harness according to an embodiment.

Description of Embodiments of the Present Disclosure

First, embodiments of the present disclosure will be listed and described.

A protector according to an aspect of the present disclosure includes:

[1] a tubular portion configured to cover an electric wire member, wherein the tubular portion includes: a base portion configured to extend partially around the electric wire member in a circumferential direction; a first lid configured to be combined with the base portion to extend entirely around the electric wire portion in the circumferential direction; and a second lid provided at a position shifted from the first lid in a length direction of the tubular portion, and configured to be combined with the base portion to extend entirely around the electric wire member in the circumferential direction, the base portion includes a rail portion and a fitted portion, the first lid includes a slide portion configured to be fitted to the rail portion by being slid in a first direction conforming to the length direction of the tubular portion, and the second lid includes a fitting portion configured to be fitted to the fitted portion by being moved in a direction intersecting the length direction of the tubular portion, and prevent sliding of the first lid in a second direction opposite to the first direction while the fitting portion is fitted to the fitted portion.

With this configuration, the slide portion of the first lid is configured to be fitted to the rail portion of the base portion by being slid in the first direction along the length direction of the tubular portion, and thus the slide portion can be engaged with the rail portion in a direction intersecting the length direction of the tubular portion over a long range in the length direction of the tubular portion. Accordingly, rattling of the first lid relative to the base portion in a direction intersecting the length direction of the tubular portion is suppressed. Accordingly, for example, even if the electric wire member is bent and subjects the first lid to force acting in a direction away from the base portion, separation of the first lid from the base portion can be suppressed. Thus, separation of the electric wire member from the base portion is suppressed, and the path of the electric wire member can be maintained as the proper path. Consequently, for example, contact between the electric wire member and nearby components can be suppressed. Also, the fitting portion of the second lid is fitted to the fitted portion of the base portion by being moved along a direction that intersects the length direction of the tubular portion. While the fitting portion is fitted to the fitted portion, the second lid prevents sliding of the first lid in the second direction, which is opposite to the first direction, and thus the slide portion fitted into the rail portion can be prevented from coming loose in the second direction.

[2] It is preferable that the second lid further includes an overlapping portion configured to overlap the first lid in a direction intersecting the length direction of the tubular portion.

With this configuration, the second lid has an overlapping portion that overlaps the first lid in a direction that intersects the length direction of the tubular portion, and thus, for example, even if the electric wire member is bent and subjects the first lid to force acting in a direction away from the base portion, separation of the first lid from the base portion is suppressed.

[3] It is preferable that the first lid further includes an engaged portion, and the overlapping portion includes an engaging portion configured to engage with the engaged portion in the first direction and the second direction.

With this configuration, the overlapping portion has the engaging portion that is engaged with the engaged portion of the first lid in the first direction and the second direction, and thus the engaging portion prevents the slide portion fitted into the rail portion from coming loose in the first direction and the second direction.

[4] It is preferable that the base portion further includes a terminal end portion configured to prevent movement of the slide portion, at an end portion of the rail portion on a side in the first direction.

With this configuration, the base portion has the terminal end portion that prevents movement of the slide portion at the end portion of the rail portion on the first direction side, and thus the terminal end portion can prevent the slide portion fitted into the rail portion from coming loose in the first direction.

[5] It is preferable that the rail portion protrudes outward from the base portion.

With this configuration, the rail portion protrudes outward from the base portion, and thus, a configuration can be employed where, compared to a configuration in which the rail portion protrudes inward, there is no protrusion on the inner side of the tubular portion, and the electric wire member can be favorably housed in the tubular portion.

A wire harness according to an aspect of the present disclosure includes

[6] the protector and the electric wire member.

With this configuration, the path of the electric wire member can be maintained as the proper path in the wire harness.

Details of Embodiments of the Present Disclosure

Specific examples of a wire harness of the present disclosure will be described below with reference to the drawings. Portions of structures may be emphasized or simplified in the drawings for the sake of description. Also, dimensional proportions of portions may differ between drawings. Note that the present disclosure is not limited to these illustrative examples, but is indicated by the claims, and all changes that come within the meaning and range of equivalency of the claims are intended to be embraced therein. The terms "parallel" and "orthogonal" as used in the present specification do not only include being exactly parallel and orthogonal but also include being substantially orthogonal and parallel within a range in which the operation and effects according to the embodiment are achieved. Also, the terms "circular" and "arc shaped" as used in the present specification do not only include being exactly circular and arc shaped but also include being substantially circular and arc shaped within a range in which the operation and effects according to the embodiment are achieved.

Overall Configuration of Wire Harness 10

As shown in FIG. 1, a wire harness 10 includes an electric wire member 11 (electric wire) and a protector 12. The wire harness 10 electrically connects electric devices in a vehicle to each other, for example.

Configuration of Electric Wire Member 11

The electric wire member 11 has an electric wire 21 and a corrugated tube 22 serving as an exterior member covering the electric wire 21. The corrugated tube 22 has a bellows structure that is tubular in shape and in which large diameter portions 23 with a larger diameter and small diameter portions 24 with a smaller diameter are alternately provided in a continuous manner in the length direction of the corrugated tube 22.

Configuration of Protector 12

The protector 12 has tubular portions 31 (tubes) that cover the electric wire member 11. The protector 12 of the present embodiment is curved at an intermediate portion thereof so as to hold the electric wire member 11 in a bent state, and has tubular portions 31 at two end portions.

Specifically, the protector 12 has a base portion 32 (base), two first lids 33, and two second lids 34.

Configuration of Base Portion 32

The base portion 32 extends partially around the electric wire member 11 in the circumferential direction. The base portion 32 of the present embodiment covers half of the electric wire member 11 in the circumferential direction. The cross-section of the base portion 32 orthogonal to a length direction conforming to an extending direction of the electric wire member 11 has an arc shape, and two ends of the arc shape respectively form opening end portions 35. The base portion 32 has a curved portion 36 at an intermediate portion in the length direction thereof. The curved portion 36 covers the outer side of the electric wire member 11 in a bent state, in other words, the side of the electric wire member 11 with the larger radius of curvature.

The base portion 32 has rail portions 37 (rails) and fitted portions 38. One rail portion 37 and one fitted portion 38 are provided on each end side of the base portion 32 in the length direction.

Figure 2:
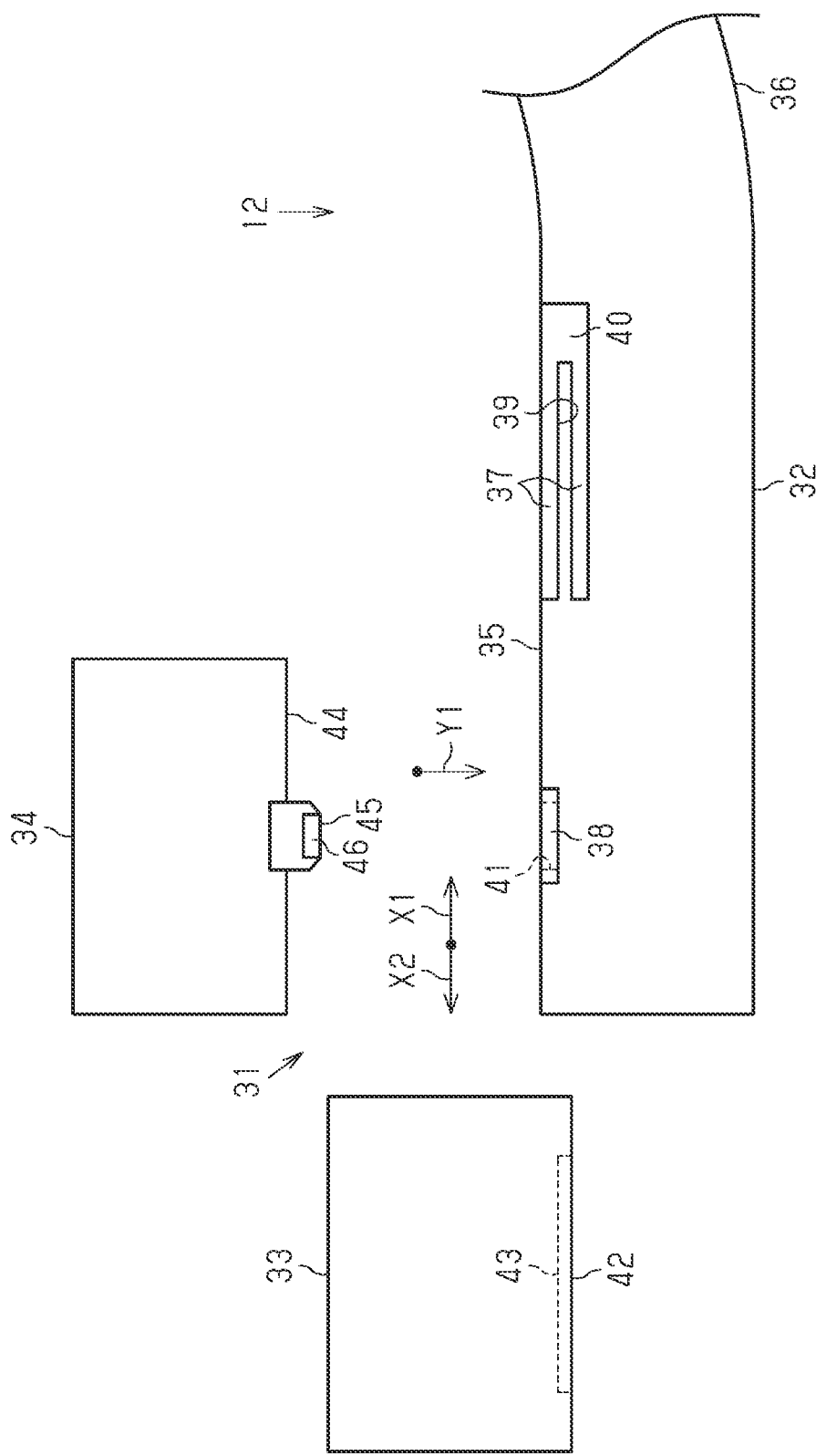
FIG. 2 is a partial exploded side view of a protector according to an embodiment.
Figure 3:
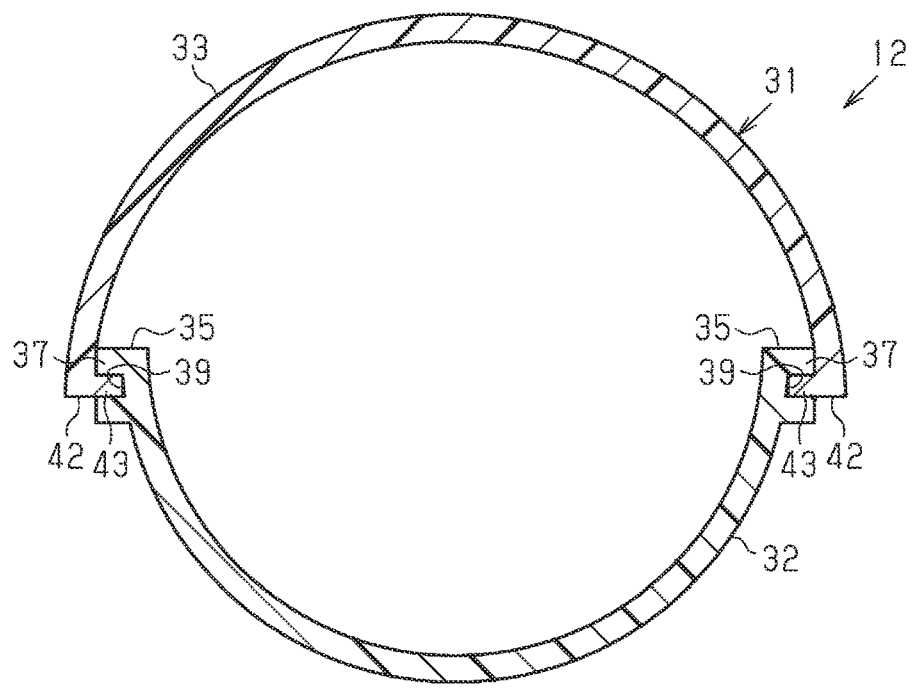
FIG. 3 is a cross-sectional view of the protector taken along line 3-3 in FIG. 1.

As shown in FIGS. 2 and 3, each rail portion 37 is provided adjacent to an opening end portion 35. The rail portion 37 protrudes outward from the base portion 32, that is, outward in a radial direction of the tubular portion 31. The rail portion 37 extends along the length direction of the base portion 32. The rail portion 37 has a groove 39 extending along the length direction of the base portion 32. Also, as shown in FIG. 2, the base portion 32 has a terminal end portion 40 at one end portion of the rail portion 37. The terminal end portion 40 is provided at the end portion of the rail portion 37 on the side corresponding to the curved portion 36 of the base portion 32. The terminal end portion 40 is provided so as to close off the groove 39 of the rail portion 37 and is the terminal end of the groove 39.

Figure 4:
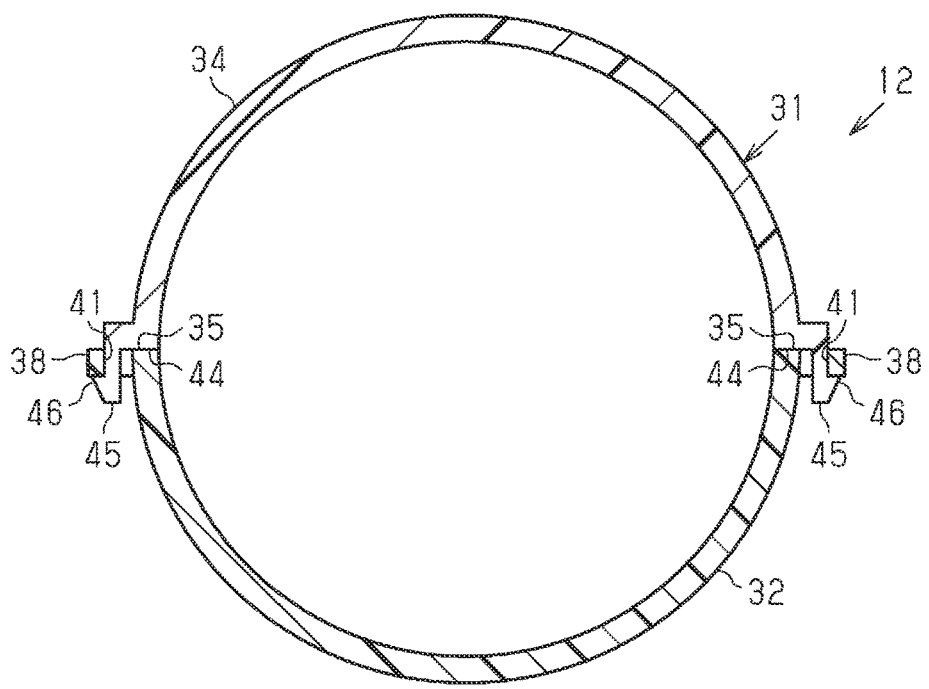
FIG. 4 is a cross-sectional view of the protector taken along line 4-4 in FIG. 1.

As shown in FIG. 2, the fitted portion 38 is provided closer to an end portion of the base portion 32 in the length direction than the rail portion 37 is. As shown in FIGS. 2 and 4, the fitted portion 38 is provided adjacent to the opening end portion 35. The fitted portion 38 protrudes outward from the base portion 32, that is, outward in the radial direction of the tubular portion 31. The fitted portion 38 has a fitting hole 41.

Configuration of First Lid 33

As shown in FIG. 1, each of the first lids 33 are combined with the base portion 32 to extend entirely around the electric wire member 11 in the circumferential direction. Each first lid 33 of the present embodiment covers half of the electric wire member 11 in the circumferential direction. The cross-section of the first lid 33 orthogonal to a length direction conforming to the extending direction of the electric wire member 11 has an arc shape, and the two ends of the arc shape respectively form opening end portions 42.

As shown in FIGS. 2 and 3, each first lid 33 has a slide portion 43 (slide). As shown in FIG. 2, the slide portions 43 are fitted into the rail portions 37 by being slid in a first direction X1 conforming to the length direction of the tubular portion 31. The first direction X1 of the present embodiment is a direction extending toward the center of the base portion 32 in the length direction, and extends toward the curved portion 36. Each slide portion 43 is provided adjacent to an opening end portion 42. The slide portion 43 protrudes inward from the first lid 33, that is, inward in the radial direction of the tubular portion 31. The slide portion 43 is shaped so as to fit into the groove 39 of the rail portion 37, and the protrusion amount, width, and length of the slide portion 43 are set so as to correspond to the depth, width, and length of the groove 39.

Configuration of Second Lid 34

As shown in FIG. 1, the second lids 34 are provided at positions shifted from the corresponding first lids 33 in the length direction of the tubular portion 31, and are combined with the base portion 32 to extend entirely around the electric wire member 11 in the circumferential direction. Each second lid 34 of the present embodiment covers half of the electric wire member 11 in the circumferential direction. The cross-section of the second lid 34 orthogonal to a length direction conforming to the extending direction of the electric wire member 11 has an arc shape, and two ends of the arc shape respectively form opening end portions 44.

As shown in FIGS. 2 and 4, each second lid 34 has a fitting portion 45. As shown in FIG. 2, the fitting portions 45 are fitted to the fitted portions 38 by being moved along a direction Y1 that intersects the length direction of the tubular portion 31. The direction Y1 of the present embodiment is the radial direction of the tubular portion 31 and is the direction in which the opening end portions 35 and 44 are brought closer to each other. Each fitting portion 45 is provided adjacent to an opening end portion 44. The fitting portion 45 protrudes outward from the second lid 34, that is, outward in the radial direction of the tubular portion 31. The fitting portion 45 has a claw 46 that is fitted and locked to the fitting hole 41 of the fitted portion 38 by being moved along the direction Y1 that intersects the length direction of the tubular portion 31.

As shown in FIG. 1, while the fitting portions 45 are fitted to the fitted portions 38, the second lids 34 are side by side with the first lids 33 in the length direction of the tubular portion 31, thus preventing sliding of the first lids 33 in a second direction X2 that is opposite to the first direction X1.

Operation of the present embodiment will be described below.

The electric wire member 11 is disposed so that half thereof in the circumferential direction is covered by the base portion 32. Then, the slide portions 43 of the first lids 33 are fitted to the rail portions 37 of the base portion 32 by being slid in the first direction X1 along the length direction of the tubular portion 31. Also, the fitting portions 45 of the second lids 34 are fitted to the fitted portions 38 of the base portion 32 by being moved in the direction Y1 that intersects the length direction of the tubular portion 31. Thus, the tubular portion 31, which is constituted by the base portion 32, the first lids 33, and the second lids 34, extends entirely around the electric wire member 11 in the circumferential direction. The electric wire member 11 is held and protected by the protector 12 in a state where the region corresponding to the curved portion 36 is bent.

Next, effects of the above embodiment will be described below.

(1) The slide portions 43 of the first lids 33 are fitted to the rail portions 37 of the base portion 32 by being slid in the first direction X1 conforming to the length direction of the tubular portion 31. Thus, the slide portions 43 can be engaged with the rail portions 37 in a direction intersecting the length direction of the tubular portion 31 over a long range in the length direction of the tubular portion 31. Accordingly, rattling of the first lids 33 relative to the base portion 32 in a direction intersecting the length direction of the tubular portion 31 can be suppressed. Thus, even if, for example, the electric wire member 11 is bent and subjects the first lids 33 to force acting in a direction away from the base portion 32, it is possible to keep the first lids 33 from separating from the base portion 32. Thus, separation of the electric wire member 11 from the base member 32 can be suppressed, and the path of the electric wire member 11 can be maintained as the proper path. Consequently, for example, contact between the electric wire member 11 and nearby components can be suppressed.

Also, the fitting portions 45 of the second lids 34 are fitted to the fitted portions 38 of the base portion 32 by being moved along the direction Y1 that intersects the length direction of the tubular portion 31. While the fitting portions 45 are fitted to the fitted portions 38, the second lids 34 prevent sliding of the first lids 33 in the second direction X2, which is opposite to the first direction X1, and thus the slide portions 43 fitted into the rail portions 37 can be prevented from coming loose in the second direction X2.

(2) The base portion 32 has the terminal end portions 40, which prevent movement of the slide portions 43, at the end portions of the rail portions 37 on the first direction X1 side, and thus the terminal end portions 40 can prevent the slide portions 43 fitted into the rail portions 37 from coming loose in the first direction X1.

(3) The rail portions 37 protrude outward from the base portion 32, and thus a configuration can be employed where, compared to a configuration in which the rail portions 37 protrude inward, there are no protrusions on the inner side of the tubular portion 31, and the electric wire member 11 can be favorably housed in the tubular portion 31, for example.

Modifications

The present embodiment can be modified and implemented as follows. The present embodiment and the following modifications can be combined and implemented provided no technical contradiction arises.

In the above embodiment, the rail portions 37 protrude outward from the base portion 32, but the present disclosure is not limited to this, and a configuration may be employed where the rail portions 37 protrude inward from the base portion 32.

Figure 5:
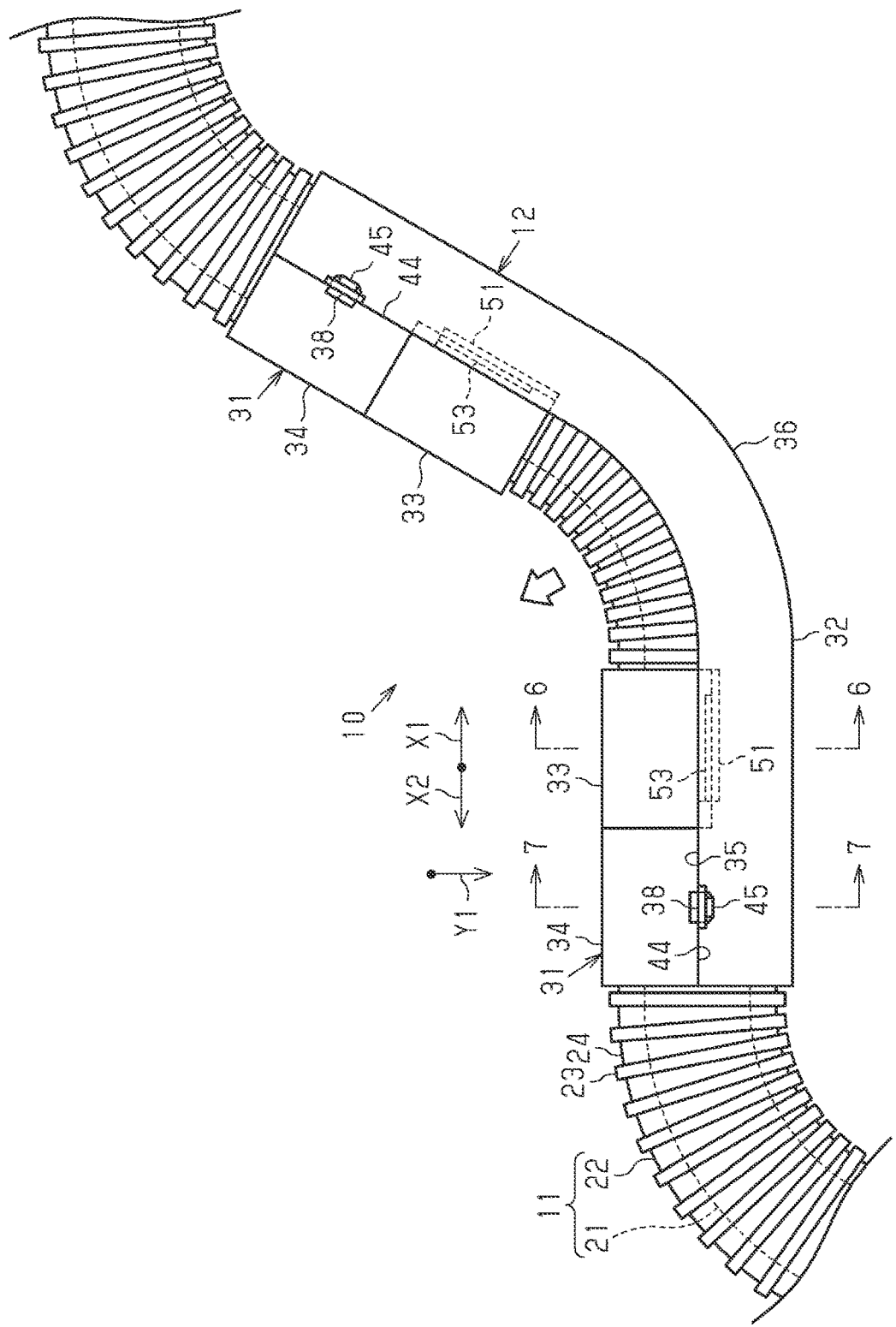
FIG. 5 is a partial side view of another wire harness.
Figure 6:
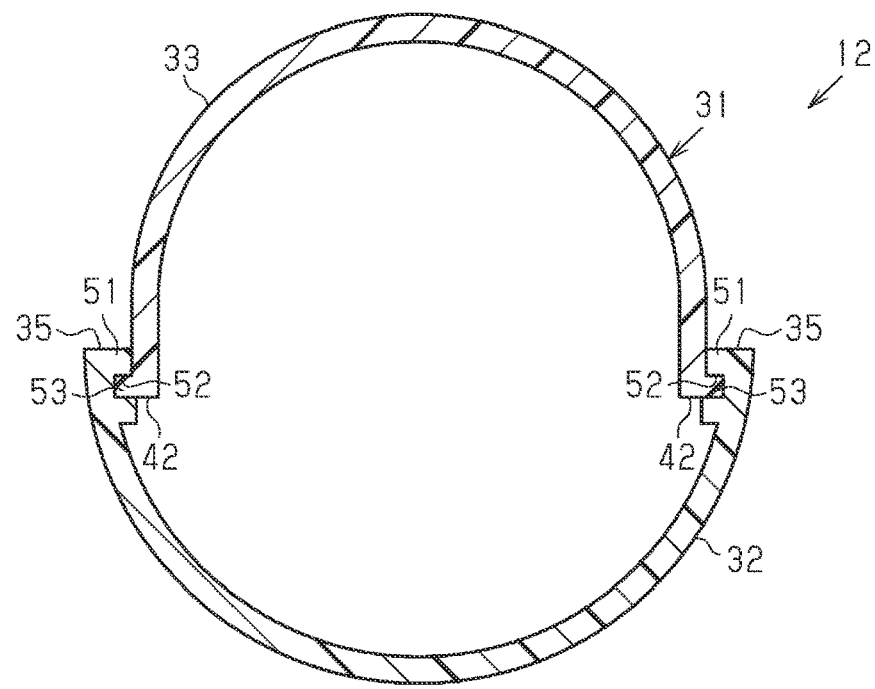
FIG. 6 is a cross-sectional view of the protector taken along line 6-6 in FIG. 5.

For example, as shown in FIGS. 5 and 6, a configuration may be employed where rail portions 51 protrude inward of the base portion 32, that is, inward in the radial direction of the tubular portion 31. The rail portions 51 extend along the length direction of the base portion 32. Each rail portion 51 has a groove 52 extending along the length direction of the base portion 32. Slide portions 53 of each first lid 33 protrude outward from the first lid 33, that is, outward in the radial direction of the tubular portion 31.

Figure 7:
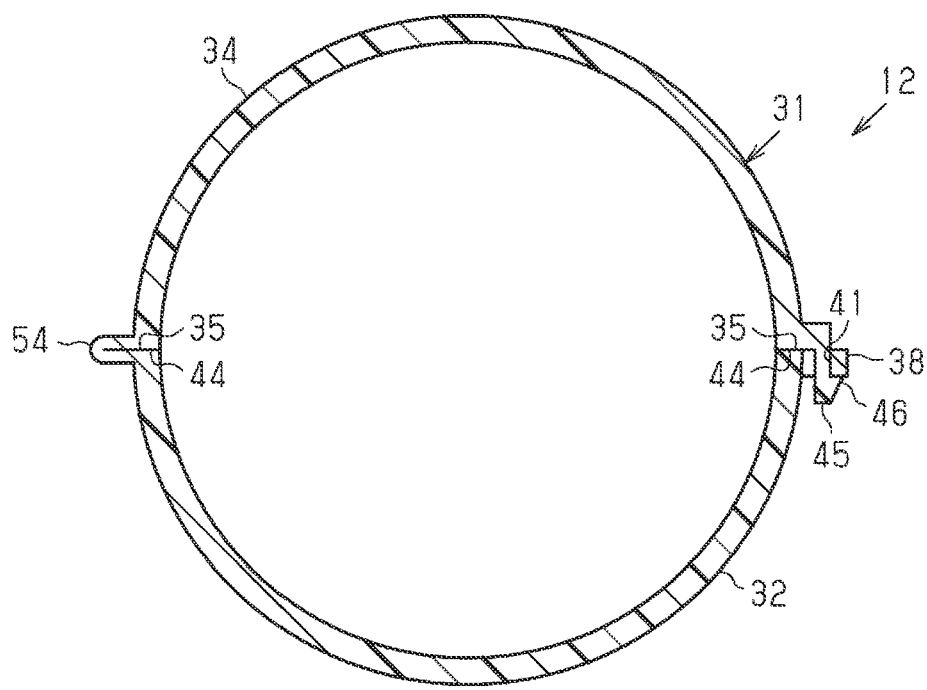
FIG. 7 is a cross-sectional view of the protector taken along line 7-7 in FIG. 5.

Also, as shown in FIG. 7, the second lids 34 of this example are each provided with the fitting portion 45 only on one opening end portion 44 side, and the other opening end portion 44 side is connected to the base portion 32 by a thin hinge portion 54. With this configuration as well, effects similar to those of (1) and (2) of the above embodiment can be obtained.

The second lids 34 of the above embodiment may be configured to have an overlapping portion that overlaps the corresponding first lid 33 in a direction that intersects the length direction of the tubular portion 31.

Figure 8:
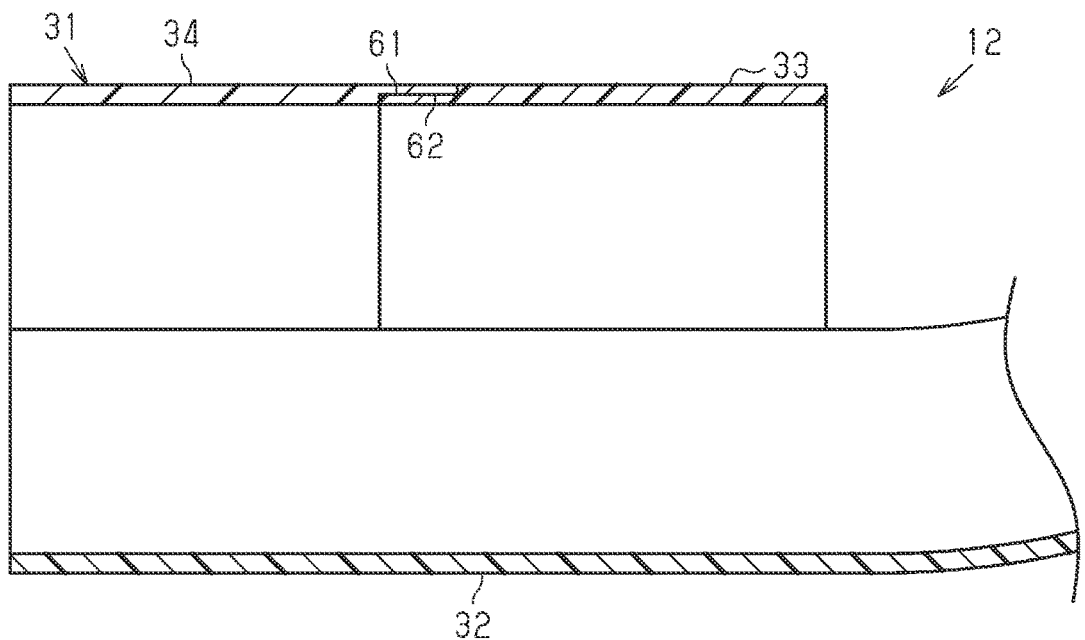
FIG. 8 is a partial cross-sectional view of another protector.

For example, a modification such as that shown in FIG. 8 may be employed. Each first lid 33 of this example has a recess 61 in the outer surface of an end portion on the second lid 34 side thereof. Each second lid 34 of this example has an overlapping portion 62 that overlaps the corresponding first lid 33 while fitted into the recess 61. Note that the recess 61 may extend partially or entirely around the first lid 33 in the circumferential direction. Also, the overlapping portion 62 may extend partially or entirely around the second lid 34 in the circumferential direction. In doing so, for example, even if the electric wire member 11 is bent and subjects the first lid 33 to force acting in a direction away from the base portion 32, separation of the first lid 33 from the base portion 32 can be further suppressed.

Figure 9:
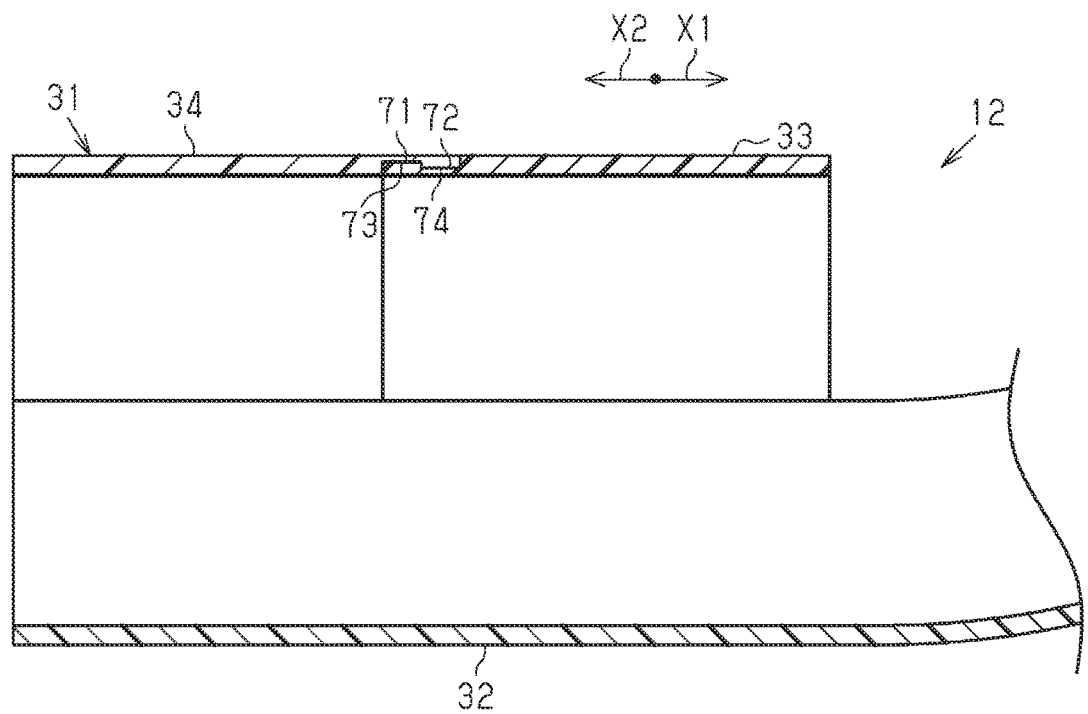
FIG. 9 is a partial cross-sectional view of another protector.

Also, a modification such as that shown in FIG. 9 may be employed, for example. Each first lid 33 of this example has a recess 71 in the outer surface of the end portion on the second lid 34 side thereof. Also, the first lid 33 of this example has an engaged portion 72 that is deeper than the recess 71. Each second lid 34 of this example has an overlapping portion 73 that overlaps the first lid 33 while fitted into the recess 71. The overlapping portion 73 has an engaging portion 74 that engages with the engaged portion 72 in the first direction X1 and the second direction X2 while fitted into the engaged portion 72.

With this configuration as well, for example, even if the electric wire member 11 is bent and subjects the first lid 33 to force acting in a direction away from the base portion 32, separation of the first lid 33 from the second lid 32 can be further suppressed. Also, the engaging portion 74 prevents the slide portion 43 fitted into the rail portion 37 from coming loose in the first direction X1 and the second direction X2. Note that, in this example, the base portion 32 does not necessarily need to have the terminal end portions 40.

In the above embodiment, the protector 12 includes two tubular portions 31, but configurations including only one tubular portion 31 or three or more tubular portions 31 may also be employed. Also, a configuration is employed above where the protector 12 has one curved portion 36, but the present disclosure is not limited to this, and a configuration including two or more curved portions 36 may be employed. Also, the extent to which the protector 12 shown in FIG. 1 is bent, specifically the extent to which the curved portion 36 is bent may be modified.

In the above embodiment, the electric wire member 11 includes the electric wire 21 and the corrugated tube 22 serving as an exterior member, but the present disclosure is not limited to this, and a configuration may be employed where the exterior member is a tubular member other than the corrugated tube 22, for example. Also, a configuration may be employed where the electric wire member 11 includes a plurality of electric wires 21, and the electric wires 21 are covered by the corrugated tube 22.

In the above embodiment, it is sufficient that the first lids 33 and the second lids 34 are separate bodies. As shown in FIG. 1, it is sufficient that a set of one first lid 33 and one second lid 34 is provided at each of the two end portions in the length direction of the base portion 32. The curved portion 36 of the base portion 32 may be referred to as a non-tubular curved intermediate portion without a lid, that is provided at a position different from the two end portions of the base portion 32 in the length direction. It is sufficient that the curved portion 36 is provided adjacent to the tubular portions 31 that each include a set of one first lid 33 and one second lid 34 in the longitudinal direction of the base portion 32. As shown in FIG. 1, it is sufficient that each second lid 34 is provided closer to an end portion of the base portion 32 in the length direction than the corresponding first lid 33 is.

In the above embodiment, the fitted portion 38 and the fitting portion 45 may have a structure in which the base portion 32 and the second lid 34 are snap-fitted to each other.

The invention claimed is:

1. A protector comprising:
a tube configured to cover an electric wire, wherein:
the tube includes:
 a base configured to extend partially around the electric wire in a circumferential direction;
 a first lid configured to be combined with the base to extend entirely around the electric wire in the circumferential direction; and
 a second lid provided at a position shifted from the first lid in a length direction of the tube, and configured to be combined with the base to extend entirely around the electric wire in the circumferential direction,
the base includes a rail and a fitted portion,
the first lid includes a slide configured to be fitted to the rail by being slid in a first direction conforming to the length direction of the tube, and
the second lid includes a fitting portion configured to be fitted to the fitted portion by being moved in a direction intersecting the length direction of the tube, and prevent sliding of the first lid in a second direction opposite to the first direction while the fitting portion is fitted to the fitted portion.

2. The protector according to claim 1,
wherein the second lid further includes an overlapping portion configured to overlap the first lid in a direction intersecting the length direction of the tube.

3. The protector according to claim 2, wherein:
the first lid further includes an engaged portion, and
the overlapping portion includes an engaging portion configured to engage with the engaged portion in the first direction and the second direction.

4. The protector according to claim 1,
wherein the base further includes a terminal end configured to prevent movement of the slide, at an end of the rail on a side in the first direction.

5. The protector according to claim 1,
wherein the rail protrudes outward from the base.

6. A wire harness comprising:
the protector according to claim 1; and
the electric wire.

* * * * *